June 20, 1961   P. M. STIGLIC   2,988,919
SPEED SENSING SYSTEM
Filed March 24, 1958

Inventor
Paul M. Stiglic

United States Patent Office 2,988,919
Patented June 20, 1961

2,988,919
SPEED SENSING SYSTEM
Paul M. Stiglic, Wickliffe, Ohio, assignor to Thompson Ramo Wooldridge Inc., a corporation of Ohio
Filed Mar. 24, 1958, Ser. No. 723,191
3 Claims. (Cl. 73—502)

The present invention relates broadly to turbo-jet engine speed indication mechanisms, and is more particularly concerned with a new and improved method and means for sensing corrected or generalized speed of the engine rotor.

It is known that the corrected engine speed of a turbo-jet engine is a function of rotor speed, normally measured in revolutions per minute, and air temperature at the engine intake or inlet. Variations in the inlet temperature or rotor speed are, of course, reflected in the corrected engine speed indication, and based upon the signal received, the aircraft pilot must position the acceleration schedules, inlet guide vane schedules, and other variable geometry components in order to assure proper engine and aircraft operation under the particular conditions encountered.

The importance of an accurate and readily available corrected engine speed signal has long been recognized in the art; however, prior systems have left much to be desired by way of simplicity, accuracy, and durability. One suggested approach consists of the use of a thermocouple located in the engine air inlet and a tachometer connected to the engine rotor, the temperature indication being passed through an amplifier and into a device capable of taking the square root of temperature and producing a reciprocal thereof, and then feeding the result into a multiplier where it is combined with the tachometer signal to provide a corrected engine speed indication in terms of rotor speed over the square root of the temperature. Such a system, while generally accurate, requires a large number of components, many of which are of a complicated nature and likely to be the source of malfunctions. Other approaches have also been proposed, but in none of these has there been a satisfactory combination of simplicity, durability or mechanical ruggedness, and accuracy.

It is therefore a primary aim of the present invention to provide a corrected rotor speed sensing system of relatively simple and mechanically rugged construction, and which is productive of extremely accurate results.

Another object of the invention lies in the provision of a corrected speed sensing device having additional utility in the steady state speed control of the engine to insure that rated conditions will not be exceeded.

Another object of the invention is to provide a new and improved system of obtaining corrected engine speed signals which features locating a sensor compressor in essentially the same environment as the engine compressor and measuring the pressure drop across said sensor compressor.

A further object of the present invention is to provide a speed sensing device from which a pressure ratio is obtained as a rapid and reliable indication of corrected engine speed.

A further object of this invention lies in the provision of a corrected engine speed sensing system wherein a sensor compressor is geared to the jet engine turboshaft and receives air at essentially the same pressures and temperatures as the engine compressor and produces a pressure ratio which is a function of corrected engine speed.

A still further object of the invention is to provide a speed sensing method in which the pressures of a fluid before and after compression are measured and recorded to produce an indication of corrected speeds.

Other objects and advantages of the invention will become more apparent during the course of the following description, particularly when taken in connection with the accompanying drawings.

In the drawings, wherein like numerals are employed to designate like parts throughout the same:

Briefly stated, the system of this invention features a sensor compressor driven by the main engine shaft and located to receive fluid at the same temperature and pressure as the engine compressor inlet. The sensor compressor discharges through a fixed restriction, and the pressure drop across the sensor compressor is measured by a ratio device. The output of said device is a function of corrected engine speed, and as such is directly usable in the control system of the turbo-jet engine.

Figure 1:
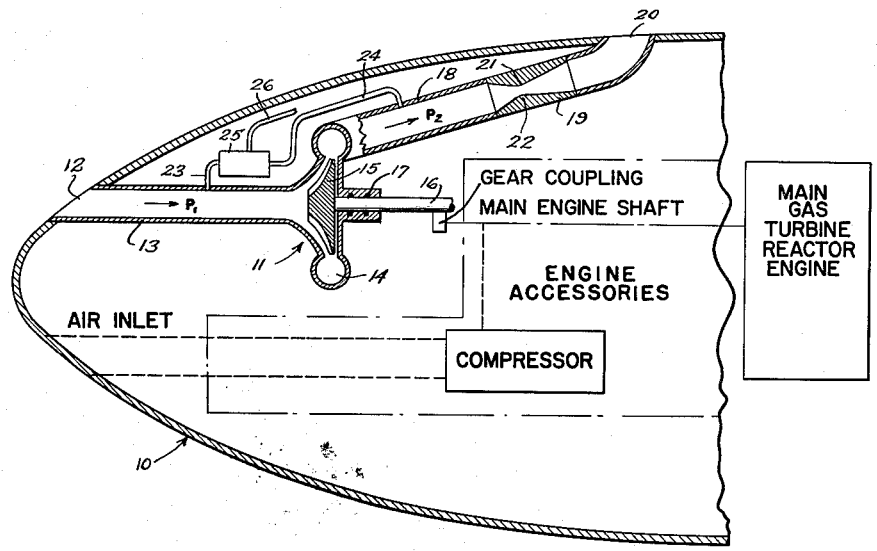
FIGURE 1 is a sectional view in side elevation of a jet engine accessory compartment showing therein an arrangement embodying the principles of this invention.

The principle underlying the outstanding effectiveness of the sensing system of the present invention is that any changes in temperature and pressure affecting the main engine compressor will similarly affect the sensor compressor, and an exemplary structural arrangement utilizing this principle is shown in FIGURE 1.

Referring thereto, the essential components of the present sensing device may be housed in the conventional engine accessory compartment, generally indicated by the numeral 10. Located within said bullet or compartment is a sensor compressor 11 of either the axial flow or centrifugal type, and preferably constructed to be relatively small and light weight. A centrifugal compressor is presently believed to have advantages by way of relatively greater ruggedness and dependability, as well as presenting less severe manufacturing problems, and a compressor of this type is accordingly shown in the drawings. However, an axial flow compressor may at times be preferred, and a two stage compressor may be found preferable over the single stage unit shown in certain applications.

It is important in the present invention that the sensor compressor 11 receive air at the same temperature and pressure as the compressor of the main engine. A preferred arrangement for accomplishing this purpose is to locate the air inlet or port of the sensor compressor just ahead or forwardly of the engine compressor inlet. The compressor 11 accordingly includes an air intake 12 positioned with respect to the engine compressor intake as indicated, and through the intake 12 air is received and directed into a passage 13 leading toward an annular compressor chamber 14. Rotatable at high speed within said chamber 14 is a rotor 15 carried by a shaft 16 journaled in bearings 17. The shaft 16 is driven by the main engine shaft (not shown), and as will be explained later, is preferably geared thereto to operate at several times the main compressor shaft speed.

Communicating with the annular compression chamber 14 is an air discharge passage 18 connecting with a fixed restriction portion 19 through which air passes prior to discharge through an outlet port 20 and into the main air inlet stream. Proper operation of the sensing device of this invention requires that the fixed restriction portion be at all times choked, and to facilitate this action, the restriction portion 19 is provided with a pair of ramp surfaces 21 and 22 which converge toward one another to present the general hour-glass configuration shown.

It is known that compressors operating at relatively low rotational speeds do not develop high pressure ratios. Since it is important that the restriction portion 22 be choked, the sensor compressor shaft 16 is geared to rotate at several times the speed of the engine compressor shaft. As a further desirable result of relatively higher speeds on the sensor compressor shaft than on the engine compressor shaft, the compressor 11 is thereby operated in a region where its speed lines are relatively steeper.

Pressure drop across the sensor compressor 11 will shortly be shown by mathematical means to be a function of corrected engine speed or turbo-shaft speed divided by the square root of inlet temperature. To record the pressure ratio between the intake and discharge sides of the compressor 11, there is provided in the inlet passage 13 a connection 23 and in the discharge passage 18 a connection 24, each terminating in a ratio device 25 from which a connection 26 is taken to indicate a ratio of the pressure in the discharge passage 18 over the pressure in the inlet passage 13. Devices capable of measuring relative pressures and recording the result in ratio form are known to the art, and in various forms are embodied in present turbo-jet control systems. It is mainly required in the present instance that the device be fast acting, accurate, and of relatively simple but mechanically rugged construction.

Figure 2:
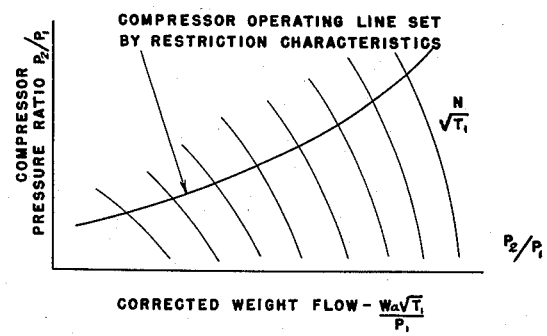
FIGURE 2 is a graphical presentation of a sensor compressor map.
Figure 3:
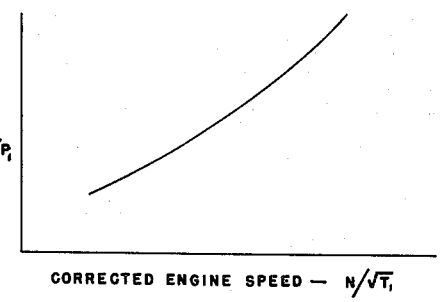
FIGURE 3 is a cross plot of the map of FIGURE 2, showing corrected engine speed and pressure ratio calibrations thereon.

It is again to be noted that the engine compressor and sensor compressor breathe intake air at the same pressure and temperature, and both are driven from the same shaft. Referring now to FIGURES 2 and 3, it may be seen that the pressure ratio of the sensor compressor is a direct measurement of corrected engine speed. A compressor map of the sensor compressor is indicated in FIGURE 2 wherein the abscissa represents values of corrected air flow against compressor pressure ratio on the ordinate. Plots of various values of corrected engine speed are shown, and the compressor operating line drawn therethrough is dictated by the characteristics of the fixed restriction portion 19.

The values appearing on FIGURE 2 may then be cross plotted with the compressor pressure ratio again appearing on the ordinate, and corrected engine speed on the abscissa and represented by the fractional designation of N or engine rotor speed in r.p.m. over the square root of the temperature or $T_1$. It is thereby readily apparent that the pressure ratio of pressure in the exhaust passageway 18 over the pressure in the intake passageway 13 provides a reliable and direct measurement of corrected engine speed since both the sensor compressor and engine compressor are supplied with fluid from the same source and are driven from the same shaft.

It has been found that proper operation of the sensing device of this invention is assured only when the operating line of FIGURE 2 is unique for all operating conditions. This occurs only when the fixed restriction portion 19 is choked, and may be shown from the following equations.

For choked flow through the restriction $$\frac{W_2\sqrt{T_2}}{P_2} = K \text{(constant)} \qquad (1)$$

Actual weight flow through the restriction is equal to weight flow through the compressor $$W_2 = W_1 \qquad (2)$$

Therefore, $$\frac{W_1\sqrt{T_1}}{P_1} = \frac{W_2\sqrt{T_2}}{P_2} \times \sqrt{\frac{T_1}{T_2}} \times \frac{P_2}{P_1} \qquad (3)$$

Substituting from Equation 1, $$\frac{W_1\sqrt{T_1}}{P_1} = K \times \sqrt{\frac{T_1}{T_2}} \times \frac{P_2}{P_1} \qquad (4)$$

In Equation 4, $P_2/P_1$ is the compressor pressure ratio, and $T_2/T_1$, the temperature ratio, is a function of the pressure ratio. Substituting into Equation 4, $$\frac{W_1\sqrt{T_1}}{P_1} = K f\left(\frac{P_2}{P_1}\right) \qquad (5)$$

Equation 5 shows that for a choked restriction the compressor operating line is unique because for a given pressure ratio $(P_2/P_1)$ there exists a fixed $$\frac{W_1\sqrt{T_1}}{P_1}$$

value.

It will now be apparent that applicant has provided a relatively simple and effective method and means of obtaining an accurate and speedy signal of corrected engine speed which does not require an excessive number of complicated components. The system may be readily installed in an existing engine accessory compartment, and represents substantial weight savings which may often be extremely critical, particularly in military aircraft. The sensor compressor 11 consists of only a single moving part in the form of the rotor 15, and the ratio device 25 may be of a construction of proven dependability. The fixed restriction portion 22 may be fabricated by production techniques, and is characterized by constant results over a long period of time.

As a further advantage of the provision of a readily obtainable corrected speed signal, it is now possible to use an acceleration schedule of limiting engine compressor pressure ratio against corrected engine speed. Accordingly, no further provisions need be made for altitude and flight speed effects. A signal as herein provided may also readily be used in the steady state speed control of the engine to insure that rated conditions will not be exceeded. It has been found that steady state speed controls that employ mechanical speed as the feed back signal allow the engine to operate beyond the corrected design speed at altitude, with the result that there frequently occurs a steady state surge or stall in engines whose operating and surge lines intersect beyond design speed.

Either an axial flow or centrifugal compressor are well adapted as the sensor compressor 11 disclosed, and more than a single stage unit may be employed to produce the results desired. In any event, however, the highest degree of accuracy from the sensor compressor 11 is obtained when said compressor is operated over the same range of Reynolds number as the engine compressor.

It will be further appreciated that various modifications may be practiced in the structures and procedures herein disclosed without departing from the spirit of the invention or the scope of the subjected claims.

While the speed sensing system of this invention is of particular application to turbo-jet engines, the novel system herein disclosed may also be utilized with good results in other gas turbine reaction engines, such as turbo-prop and ducted fan engines.

I claim as my invention:

1. A speed sensing system for a gas turbine reaction engine of the type having an engine compressor formed with an air inlet and driven by the main engine shaft, comprising, an auxiliary compressor operable as a sensor compressor and having a gear coupling for connection with the main engine shaft and being co-rotatable therewith at proportionate rotational speeds, means forming an inlet for said sensor compressor located to receive fluid at the same pressure and temperature as the engine compressor inlet, means forming an outlet through which said sensor compressor discharges, said outlet having formed therein a fixed restriction to provide a choked discharge flow, and a ratio device connected to said inlet and to said outlet ahead of said restriction, whereby the pressure ratio measured by said ratio device across said sensor compressor will be a function of engine speed divided by the square root of inlet temperature.

2. A speed sensing system as defined in claim 1, said auxiliary compressor comprising a centrifugal pump.

3. A speed sensing system as defined in claim 1, said fixed restriction comprising means having a pair of ramp surfaces converging toward one another to present a generally hour-glassed configuration to the discharge flow.

References Cited in the file of this patent

UNITED STATES PATENTS

| | | |
|---|---|---|
| 2,580,962 | Sedille | Jan. 1, 1952 |
| 2,692,476 | Schaal et al. | Oct. 26, 1954 |
| 2,800,015 | Shaw | July 23, 1957 |
| 2,811,830 | Gartner | Nov. 5, 1957 |
| 2,848,869 | Russ | Aug. 26, 1958 |
| 2,873,576 | Lombard | Feb. 17, 1959 |

FOREIGN PATENTS

| | | |
|---|---|---|
| 580,149 | Great Britain | Aug. 8, 1946 |